United States Patent [19]
Song et al.

[11] Patent Number: 6,091,553
[45] Date of Patent: Jul. 18, 2000

[54] PICKUP ACTUATOR

[75] Inventors: Myoung-jong Song; Young-chul Kim, both of Suwon, Rep. of Korea

[73] Assignee: Samsung Electronics Co., Ltd., Suwon, Rep. of Korea

[21] Appl. No.: 09/186,697

[22] Filed: Nov. 6, 1998

[30] Foreign Application Priority Data

Oct. 28, 1998 [KR] Rep. of Korea ............... 98-45251

[51] Int. Cl.⁷ .................................................. G02B 7/02
[52] U.S. Cl. .................. 359/813; 369/44.14; 359/823; 359/824
[58] Field of Search ..................... 359/814, 823, 359/824; 369/44.14, 44.15, 44.16

[56] References Cited

U.S. PATENT DOCUMENTS

| 4,479,051 | 10/1984 | Musha | 250/202 |
| 4,658,390 | 4/1987 | Fujii et al. | 369/45 |

FOREIGN PATENT DOCUMENTS

| 59-17042 | 2/1984 | Japan . |
| 2-29937 | 1/1990 | Japan . |
| 4-149025 | 5/1992 | Japan . |
| 4-249224 | 12/1992 | Japan . |
| 5-314511 | 11/1993 | Japan . |
| 9-185830 | 7/1997 | Japan . |

*Primary Examiner*—Georgia Epps
*Assistant Examiner*—Tim Thompson
*Attorney, Agent, or Firm*—Staas & Halsey LLP

[57] ABSTRACT

A pickup actuator employed in an optical device for recording/reproducing information on/from an optical disc by using an optical device. The pickup actuator has a base member, a pair of yokes disposed at the base member and spaced from each other at a predetermined distance, a pair of magnets respectively attached to inner side surfaces of the yokes, a lens holder which is suspended by two pairs of wire springs so as to be moved toward directions of focusing and tracking in a space defined between the magnets, and on which an objective lens is mounted, a driving coil disposed at the lens holder, for driving the lens holder toward directions of focusing and tracking by electromagnetically interacting with the magnets, a pair of supporting plates disposed on the wire springs adjacent to opposite sides of one of the magnets, and a damping fluid applied between the pair of supporting plates and both opposite side portions of the one magnet, respectively for damping the vibration occurring at the lens holder when the lens holder is driven. Accordingly, when a vibration at the lens holder occurs, the vibration is directly damped by the damping fluid disposed between the one magnet and the wire springs which are supporting by the lens holder. Thus, an objective lens is allowed to reach a designated spot more rapidly. Accordingly, the pickup actuator can be employed in an optical device having the vibration of high intensity, such as in automobiles, etc.

50 Claims, 9 Drawing Sheets

PICKUP ACTUATOR

CROSS-REFERENCE TO RELATED APPLICATIONS

This application claims the benefit of Korean Application No. 98-45251, filed Oct. 28, 1998, in the Korean Patent Office, the disclosure of which is incorporated herein by reference.

BACKGROUND OF THE INVENTION

1. Field of the Invention

The present invention relates to a pickup actuator employed into an optical device for recording/reproducing information on/from optical disc by using an optical means.

2. Description of the Related Art

A field of optical means for recording/reproducing an information on/from information recording medium such as optical disc is already in the limelight as a new technique of the coming era. Especially, a pickup actuator is considered as an important component of the optical device, since it determines the speed of recording/reproducing of information. Such a pickup actuator schematically comprises a base member, a lens holder, and lens holder driving means. The lens holder is movably disposed with respect to the base member. An objective lens is mounted on the lens holder. The objective lens projects a light beam to a recordable side of the optical disc to read the information as an optical signal, or record the information on the optical disc. The lens holder driving means drives the lens holder toward directions of focusing and tracking.

An example of such a pickup actuator is shown in FIGS. 1 to 3.

FIG. 1 is an exploded perspective view showing a conventional pickup actuator, FIG. 2 is a perspective view showing the pickup actuator assembled, and FIG. 3 is a sectional view for showing a main portion of the pickup actuator shown in FIG. 2.

A reference numeral 10 is a base member. As shown in FIGS. 1 to 3, the base member 10 comprises a body portion 12 and a holder supporting portion 14. A pair of yokes 20 and 20' are disposed at an upper side of the body portion 12, while facing each other and having a predetermined distance therebetween. The holder supporting portion 14 is attached to an outer side surface of one of the yokes 20 and 20' by a plurality of screws 16a and 16b.

Further, a pair of magnets 30 and 30' are attached to respective inner side surfaces of the yokes 20 and 20'. The magnets 30 and 30' form a magnetic circuit. The yokes 20 and 20' function to maximize and concentrate the magnetic flux density toward a desired direction.

A reference numeral 40 is a lens holder. The lens holder 40 is disposed between the magnets 30 and 30' which are disposed at the base member 10. An objective lens 42 is mounted on the lens holder 40. The lens holder 40 is suspended at the holder supporting portion 14 of the base member 10 by two pairs of wire springs 44a and 44b such that the lens holder 40 is movable. One ends of the wire springs 44a and 44b are connected to both sides of the lens holder 40, while other ends thereof are connected to the holder supporting portion 14 after passing through a space 14a defined at an inner portion of the holder supporting portion 14.

Further, a driving coil 50 is disposed at the lens holder 40 together with the magnets 30 and 30', constituting a lens holder driving means.

The driving coil 50 has a pair of focusing coils 52a and 52b and a tracking coil 54. The focusing coils 52a and 52b are wound around opposite sides of the lens holder 40, while the tracking coil 54 is wound in a perpendicular fashion with respect to the focusing coils 52a and 52b. The focusing coils 52a and 52b and the tracking coil 54 move the lens holder 40 toward directions of focusing and tracking, in cooperation with the magnets 30 and 30'.

In a conventional pickup actuator constructed as above, focusing and tracking of the objective lens 42 are performed by an electromagnetic interaction between the magnets 30 and 30', the focusing coils 52a and 52b, and the tracking coil 54.

The above conventional pickup actuator, however, has a drawback as follows. Since the lens holder 40 is suspended at the holder supporting portion 14 by the wire springs 44a and 44b, during focusing and tracking of the objective lens 42, a lot of time is taken for the objective lens 42 to reach the designated spot and be settled therein.

The above drawback will be described in greater detail with respect to FIG. 4. As shown in FIG. 4, an Y-axis ("S") is a distance that the objective lens 42 is supposed to be moved to be settled in the designated spot, and an X-axis ("t") is a time taken for the objective lens 22 to reach the designated spot and be settled therein.

"Ga" in FIG. 4 is a line for indicating an ideal movement of the objective lens 42. In this case, it takes "0" (zero) seconds for the objective lens 42 to reach the designated spot "T" and be settled therein. However, it is almost impossible because the objective lens 42 has to have a speed reaching an infinite value in an instant, to be moved to the designated spot "T".

"Gb" in FIG. 4 is a line for indicating an actual movement of the objective lens 42. In this case, it takes "$t_b$" for the objective lens 42 to reach the designated spot "T" and be settled therein.

If the objective lens 42 is moved at a greater speed to shorten the time "$t_b$", the time can be shortened to "$t_c$", however, there inevitably occurs the vibration of the objective lens 42 until the objective lens 42 is settled in the designated spot "T".

As described, the greater the speed the moving objective lens 42 has, the greater vibration the objective lens 42 has. Thus, if the vibration is efficiently damped, the objective lens 42 can be settled in the designated spot "T" more rapidly.

In the past, it has been suggested that a damper bond 60 in a gel state be injected into the inner portion of the holder supporting portion 14 in order to damp the vibration. Due to the presence of the damper bond 60, the vibration transmitted through the wire springs 44a and 44b is damped more rapidly, namely in a time "$t_d$". (Ref. "Gd" line in FIG. 4)

Despite the damper bond 60, however, there is a limit to increasing the speed of the focusing and tracking operation of the objective lens 42, since the vibration occurring at the lens holder 60 is damped by the damper bond 40 only after the vibration is transmitted through the wire springs 44a and 44b to the damper bond 60.

Particularly when the optical device is employed into the automobiles which have intensive outside vibrations, or when the physical shock is exerted to the optical device, the vibration occurring at the lens holder 40 is not quickly damped, and there occurs a mis-function of the optical device.

Further, the damper bond 60 has to be injected into the inner space 14a defined within the holder supporting portion 14 from a side thereof. Thus, injecting of the damper bond 60 itself has been a complex process, which deteriorates a productivity of the optical pickup device.

In addition, after injecting the damper bond 60, the damper bond 60 has to be solidified to some degree by ultraviolet rays radiated thereto. Thus, a manufacturing process of the optical pick device becomes more complex, and a manufacturing cost thereof accordingly increases.

SUMMARY OF THE INVENTION

The present invention has been made to overcome the above-described problems, and accordingly, it is an object of the present invention to provide a pickup actuator capable of rapidly moving the objective lens to a designated spot by rapidly damping a vibration occurring at a lens holder during a focusing and tracking operation of an objective lens.

Another object of the present invention is to provide a pickup actuator capable of preventing a possible misfunction of the optical device by rapidly damping a vibration occurring at a lens holder caused by an outside vibration or shock.

Yet another object of the present invention is to provide a pickup actuator which does not need a damper bond injection process, and thus has a simpler manufacturing process along with less manufacturing costs.

Additional objects and advantages of the invention will be set forth in part in the description which follows and, in part, will be obvious from the description, or may be learned by practice of the invention.

The above objects will be accomplished by a pickup actuator according to the present invention comprising a base member, and a lens holder supported with respect to the base member. A side of the lens holder is suspended by two pairs of wire springs so that the lens holder is moved in directions of focusing and tracking. An objective lens is mounted on the lens holder. The lens holder is driven toward directions of focusing and tracking relative to the base member by lens holder driving means. A damping fluid is applied between the lens holder driving means and the two pairs of wire springs, to damp the vibration occurring at the lens holder when the lens holder is driven.

Here, it is preferable that the damping fluid has a viscosity ranging from 1000 cP to 2000 cP at about 27° C., and is magnetized to 100 G~200 G in a magnetic field of 3~4 kOe.

According to a first preferred embodiment of the present invention, the pickup actuator includes a base member, a pair of yokes disposed at the base member which are spaced from each other at a predetermined distance, a pair of magnets respectively attached to inner side surfaces of the yokes, and a lens holder which is suspended by two pairs of wire springs so as to be moved toward directions of focusing and tracking in a space defined between the magnets. An objective lens is mounted on the lens holder. Also, a driving coil is disposed at the lens holder, to drive the lens holder toward directions of focusing and tracking together with the magnets. A pair of supporting plates are disposed on the wire springs adjacent to opposite sides of one of to the magnets respectively. A damping fluid is applied between the supporting plates and both opposite side portions of the one magnet respectively, to damp the vibration occurring at the lens holder when the lens holder is driven.

According to the second preferred embodiment of the present invention, the pickup actuator has a base member, first and second yokes disposed at an upper surface of the base member, which are spaced from each other at a predetermined distance, first and second magnets respectively attached to inner side surfaces of the yokes, and a lens holder disposed so as to be moved toward directions of focusing and tracking between the first and the second magnets. An objective lens is mounted on the lens holder. Also, a driving coil is disposed at the lens holder, to drive the lens holder toward directions of focusing and tracking together with the first and second magnets. The lens holder is disposed on the base member, while being suspended by two pairs of first wire springs. Each of a pair of first supporting plates are disposed on a corresponding one of the two pairs of first wire springs adjacent to the first magnets. A damping fluid is applied between first supporting plates and respective opposite sides the first magnet, to damp the vibration occurring at the lens holder when the lens holder is driven. Meanwhile, two pairs of second wire springs are disposed at the lens holder extended in a symmetrical relation with respect to the first wire springs. Each of a pair of second supporting plates are disposed on to opposite side portion of the magnet 30', respectively second wire springs. The damping fluid is applied between the pair of second supporting plates and respective opposite sides of the second magnet.

According to the pickup actuator of the present invention, when there occurs the vibration at the lens holder, the vibration is directly damped by the damping fluid disposed between the magnets and the wire springs which are supporting the lens holder. Thus, the objective lens is allowed to reach the designated spot more rapidly.

Further, since there is no need for injection a damper bond into an inner portion of an the holder supporting portion, the manufacture processes of optical pickup become simpler, and the manufacture costs thereof accordingly decrease.

BRIEF DESCRIPTION OF THE DRAWINGS

The above object and advantages will be more apparent by describing preferred embodiments in greater detail with reference to the drawings accompanied, in which.

DESCRIPTION OF THE PREFERRED EMBODIMENT

Figure 1:
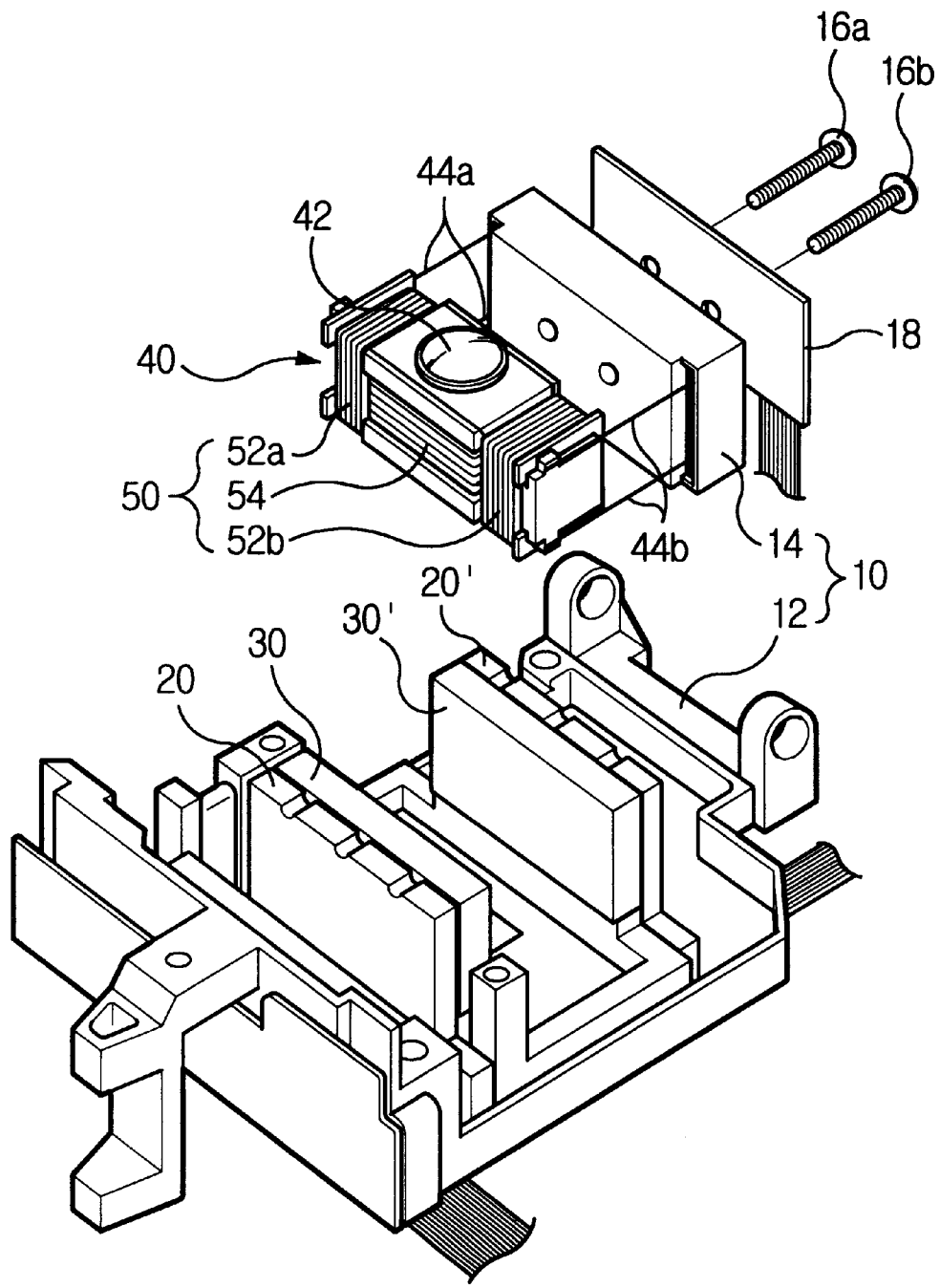
FIG. 1 is an exploded perspective view showing a conventional pickup actuator.
Figure 2:
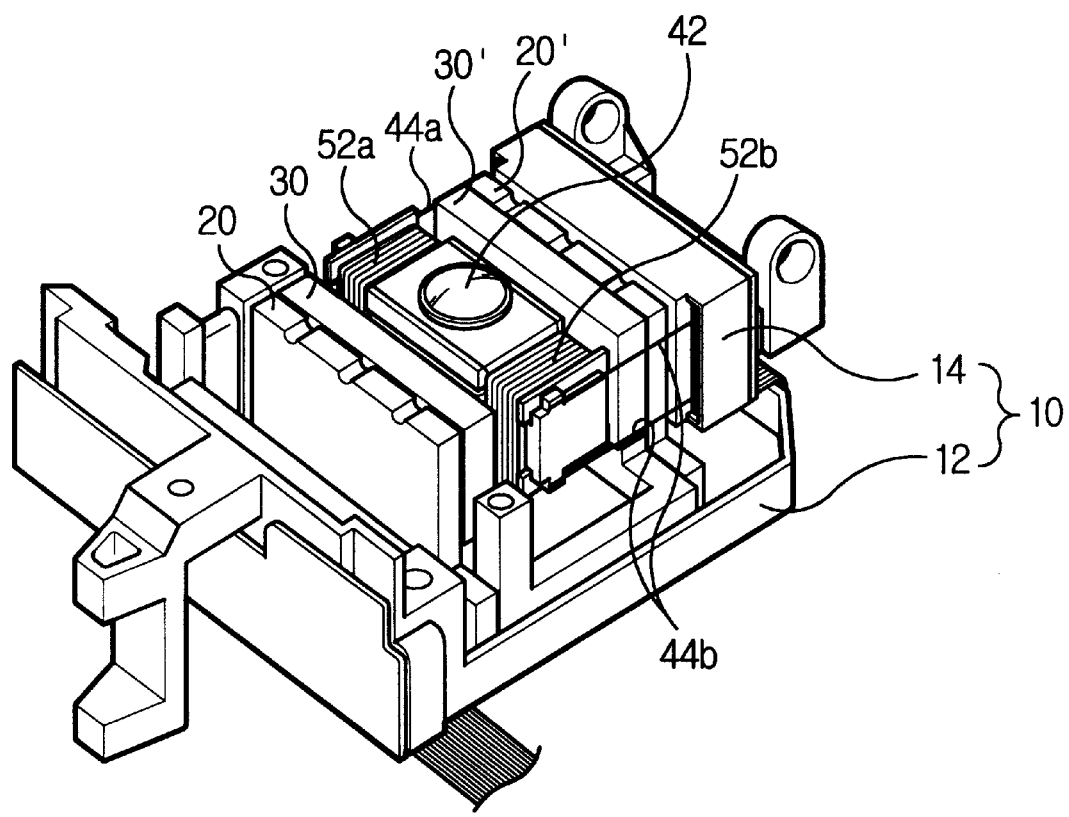
FIG. 2 is a perspective view showing the pickup actuator shown in FIG. 1 assembled.
Figure 3:
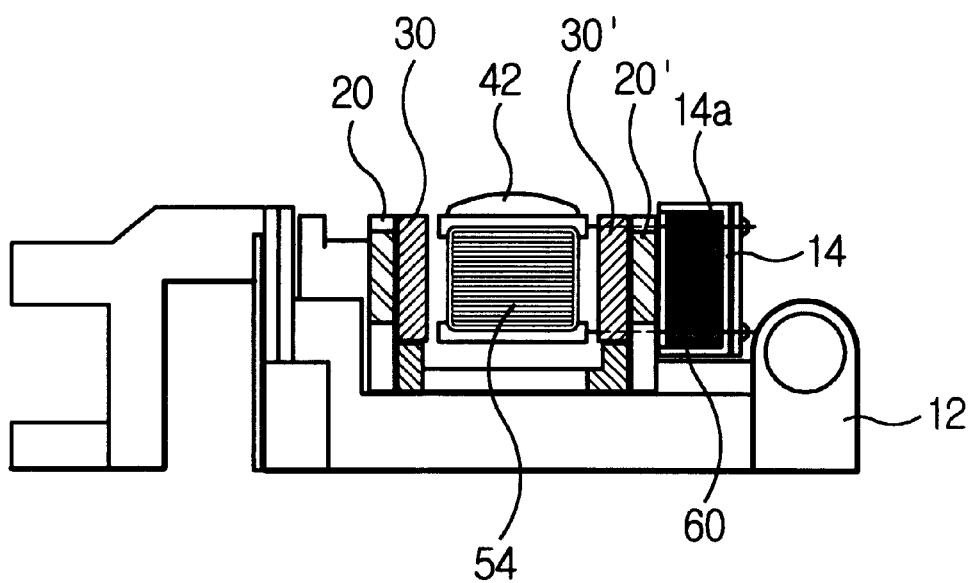
FIG. 3 is a sectional view showing a main portion of the pickup actuator of FIG. 2.
Figure 4:
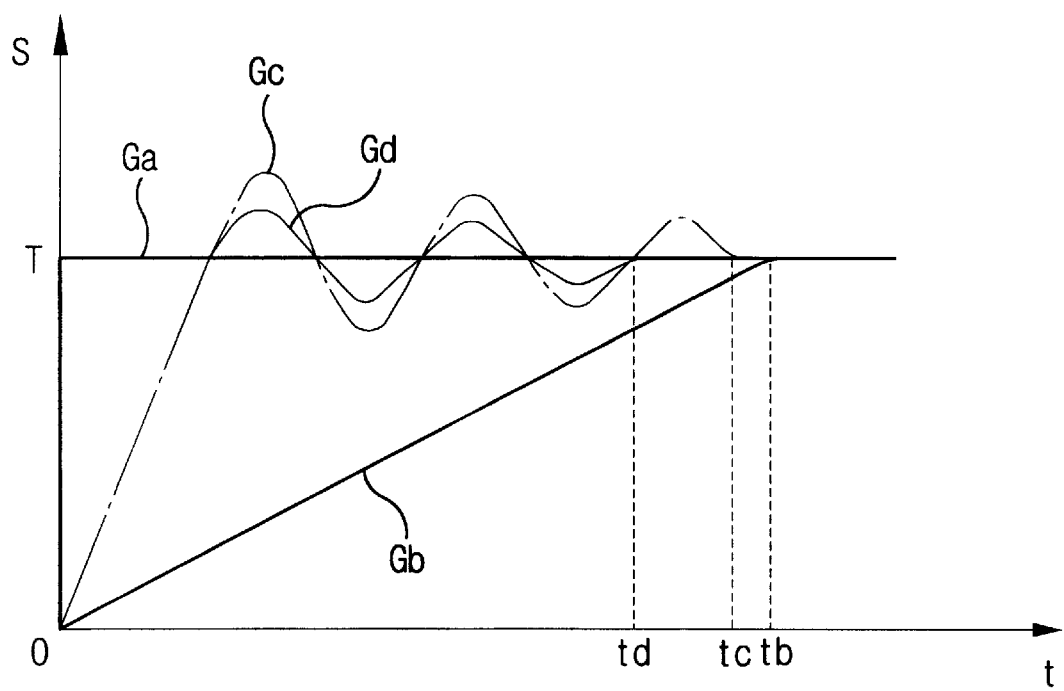
FIG. 4 is graph for explaining a damping effect obtained by a conventional damper bond.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
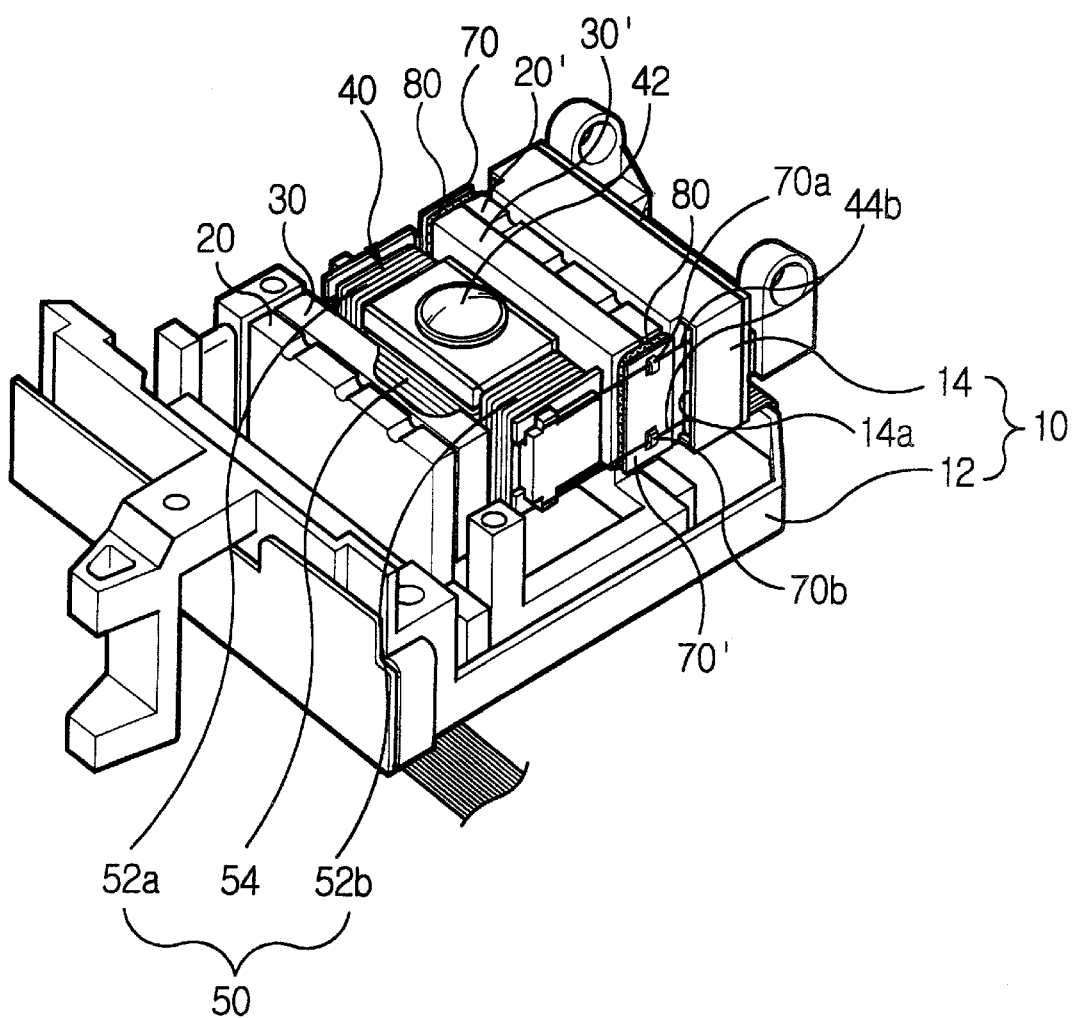
FIG. 5 is a perspective view showing a pickup actuator according to first preferred embodiment of the present invention.
Figure 6:
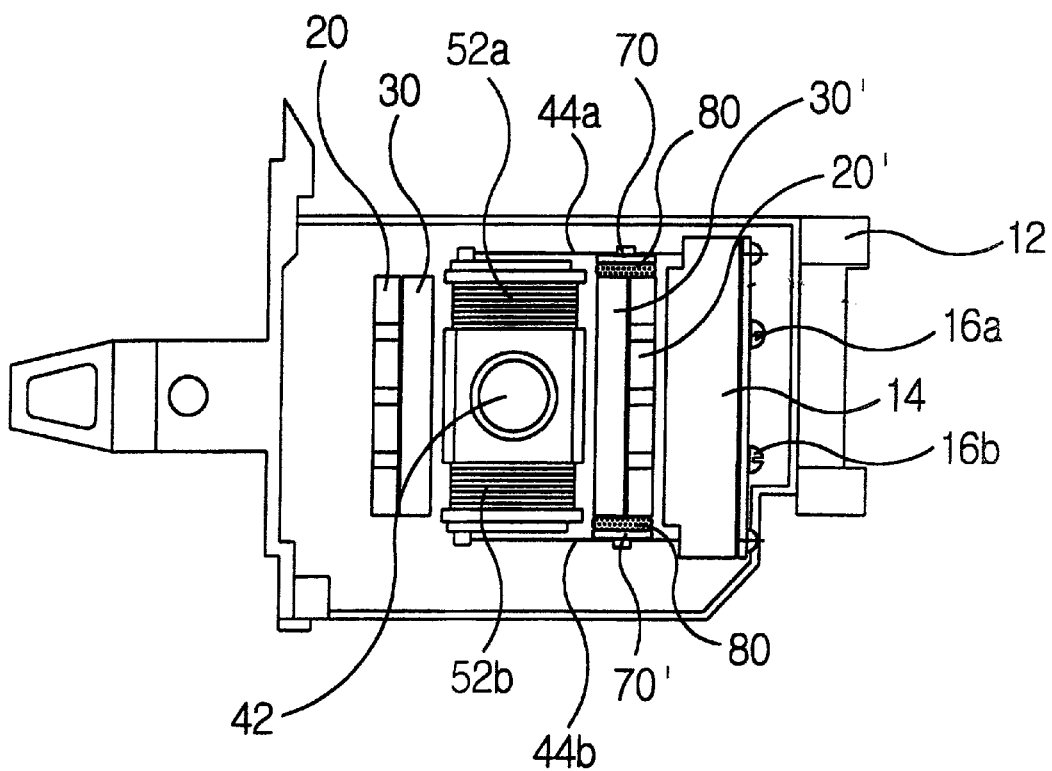
FIG. 6 is a plan view showing a pickup actuator shown in FIG. 5.
Figure 7:
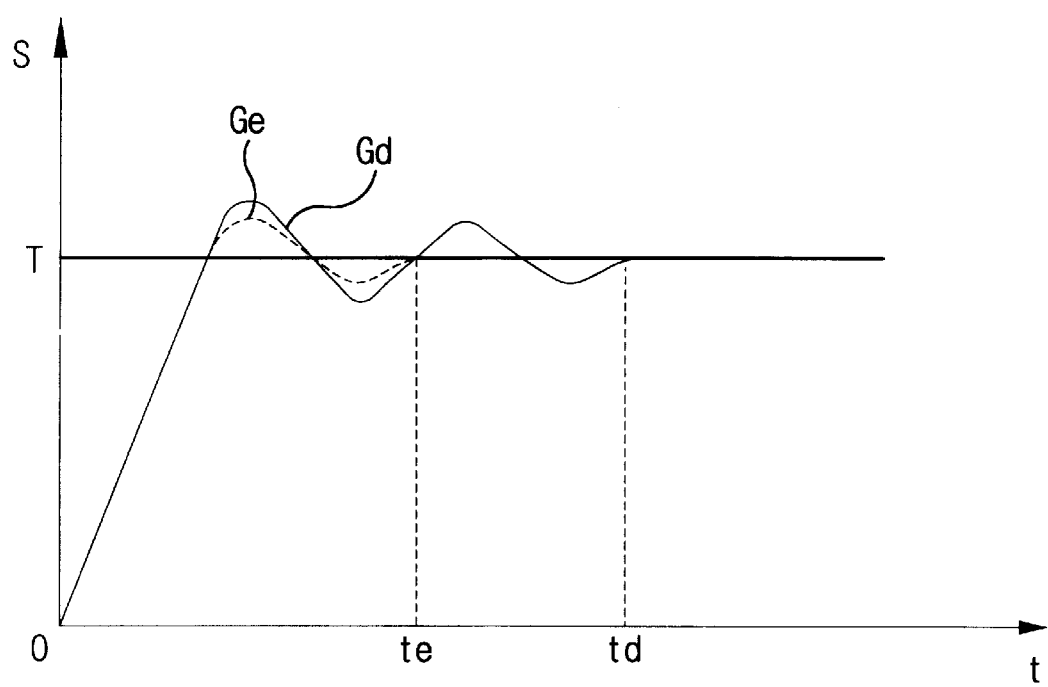
FIG. 7 is a graph for explaining a damping effect obtained by a damping fluid according to the embodiments of the present invention.

FIG. 5 shows a pickup actuator according to a first preferred embodiment of the present invention. FIG. 6 is a plan view showing the pickup actuator shown in FIG. 5, and FIG. 7 is a graph for explaining a damping effect obtained by a damping fluid according to the embodiments of the present invention.

It should be understood that like elements would be given the same reference numerals throughout. Accordingly, a reference numeral 10 in the figures is a base member, 20 and 20' are yokes, 30 and 30' are magnets, 40 is a lens holder, and 50 is a driving coil. Additionally, 70 and 70' are supporting plates, and 80 is a damping fluid.

As shown in FIGS. 5 and 6, the base member 10 comprises a body portion 12 and a holder supporting portion 14.

The yokes 20 and 20' are disposed at the body portion 12 of the base member 10, while being spaced from each other at a predetermined distance. The holder supporting portion 14 is attached to an outer side surface of the yoke 20' by a plurality of screws 16a and 16b.

Further, the magnets 30 and 30' are attached to inner side surfaces of the yokes 20 and 20', respectively. The magnets 30 and 30' form a magnetic circuit. The yokes 20 and 20' function to maximize and concentrate the magnetic flux density toward a desired direction.

The lens holder 40 is disposed between the magnets 30 and 30' which are disposed at the base member 10. An objective lens 42 is mounted on the lens holder 40, approximately at a middle portion of the lens holder 40. The lens holder 40 is suspended at the holder supporting portion 14 of the base member 10 by two pairs of wire springs 44a and 44b such that the lens holder 40 is movable. One ends of the wire springs 44a and 44b are respectively connected to both sides of the lens holder 40, while other ends thereof are respectively connected to the holder supporting portion 14 after passing through the space 14a defined at both sides of the holder supporting portion 14 respectively.

The driving coil 50 is disposed at the lens holder 40, and constitutes a lens holder driving means together with the magnets 30 and 30'. The driving coil 50 has a pair of focusing coils 52a and 52b, and a tracking coil 54. The focusing coils 52a and 52b are wound around the opposite sides of the lens holder 40, while the tracking coil 54 is wound in a perpendicular fashion with respect to the focusing coils 52a and 52b. Here, the focusing coils 52a and 52b, and the tracking coil 54 move the lens holder 40 toward the directions of focusing and tracking, in cooperation with the magnets 30 and 30'.

The supporting plates 70 and 70' are respectively disposed on the two pairs of wire springs 44a and 44b which are supporting the lens holder 40. The supporting plates 70 and 70' are also positioned adjacently to opposite side portions of the magnet 30', respectively. The supporting plates 70 and 70' are respectively disposed on the wire springs 44a and 44b in such a manner that the wire springs 44a and 44b are hung on a pair of hooks 70a and 70b which are formed integrally on side surfaces of each of the supporting plates 70 and 70'. Each of the hooks 70a or 70b is spaced from the other at a predetermined distance. Such a structure of the supporting plates 70 and 70', however, is not limited to the example suggested here, but can be varied in many ways. Preferably, the wire springs 44a and 44b are not fixedly attached to the hooks 70a, 70b.

Although it is shown that the supporting plates 70 and 70' are disposed between the two pairs of wire springs 44a and 44b, the wire springs 44a and 44b may be disposed between the supporting plates 70 and 70'.

Since the supporting plates 70 and 70' have to be spaced from the side of the magnet 30' for the functional purposes, it is preferable that the supporting plates 70 and 70' are made of a nonmagnetic material, and more preferably made of a plastic.

The damping fluid 80 is applied between the supporting plates 70 and 70' and opposite sides of the magnet 30' which are adjacently positioned to the supporting plates 70 and 70' respectively. The damping fluid 80 functions to damp a vibration of the lens holder 40, when the lens holder 40 is moved toward the directions of focusing and tracking. Accordingly, the vibration which occurs when the lens holder 40 is moved toward the directions of focusing and tracking and transmitted to the wire springs 44a and 44b are more efficiently damped.

The damping fluid 80 is a magnetic fluid whose magnetic particles are not separated from the damping fluid 80 even when a centrifugal force of high intensity or a magnetic field is exerted on the damping fluid 80. Particularly, the magnetic fluid is in a colloid state, wherein the magnetic particles are stably dispersed. Here, $Fe_3O_4$ can be utilized as the magnetic particle.

It is preferable that the damping fluid 80 has a viscosity ranging from 1000 cP to 2000 cP, at 27° C. Additionally, it is preferable that the damping fluid 80 is magnetized to a degree from 100 G to 200 G in the magnetic field of 3~4kOe.

Accordingly, due to the viscosity thereof, the damping fluid 80 damps the vibration of the lens holder 40. Further, the damping fluid 80 does not gravitate downward but stays properly between the magnet and 30' and the lens holder 40, due to a magnetic property thereof.

A U.S. corporation, Ferrofluidics, disclosed a preferred example of such a damping fluid 80, i.e., a magnetic fluid. According to the related data, the disclosed magnetic fluid is composed of 4~6% of magnetite, 16~20% of oil soluble dispersant, 73~80% of carrier liquid, and 0~1% of aromatic amine.

In the pickup actuator according to the first preferred embodiment of the present invention constructed as above, the lens holder 40 is moved toward the directions of focusing and tracking by an electromagnetic interaction between the magnets 30 and 30', and the focusing and the tracking coils 52a, 52b, and 54, thereby performing the focusing and tracking operation of the objective lens 42.

In such a situation, as described in the Related Art, the vibration occurs. Such vibration is transmitted through the wire springs 44a and 44b, and directly damped by the damping fluid 80 disposed between the supporting plates 70 and 70' on which the wire springs 44a and 44b are hung, and the magnets 30 and 30'.

Accordingly, as indicated by a line "Ge" in FIG. 7, the time "$t_e$" taken for the objective lens 22 to reach the designated spot "T" and be settled therein is remarkably shortened, in comparison with the time $t_d$ spent with the conventional damper bond (see line "Gd" of FIG. 7) to reach the designated spot "T".

Figure 8:
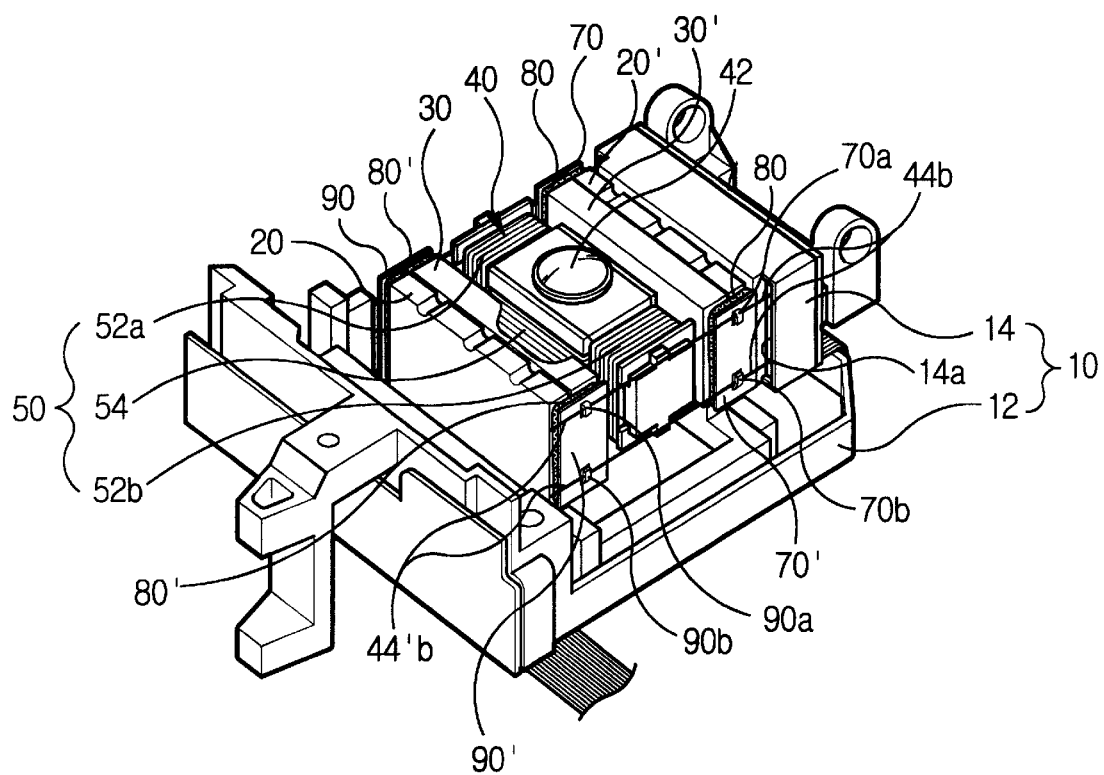
FIG. 8 is a perspective view showing a pickup actuator according to a second preferred embodiment of the present invention.
Figure 9:
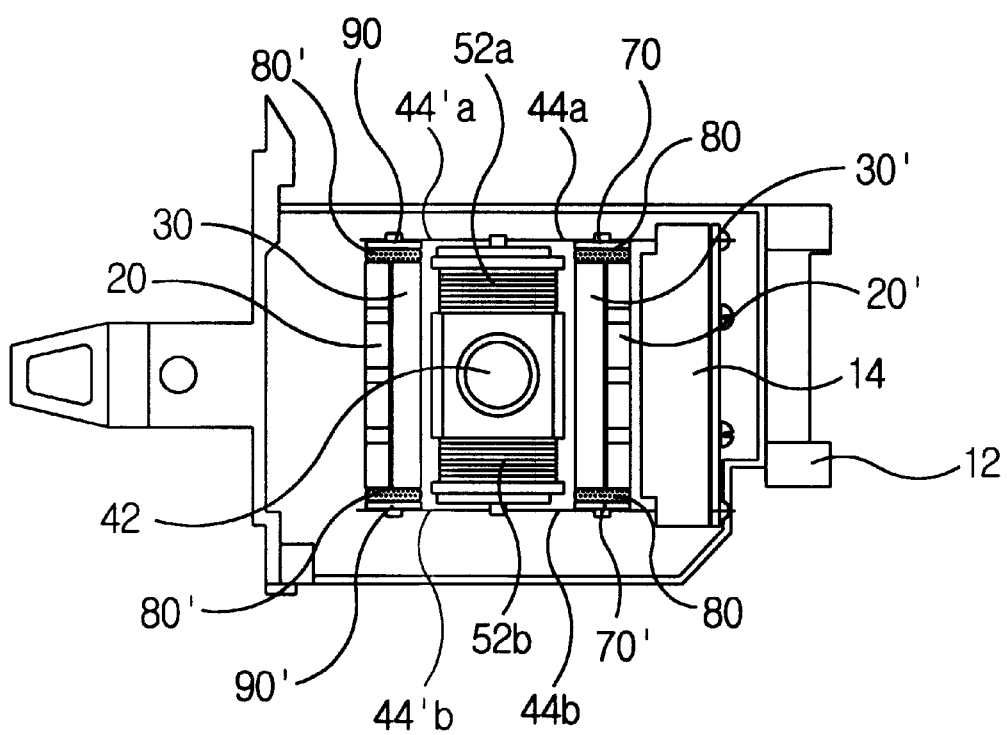
FIG. 9 is a plan view showing a pickup actuator shown in FIG. 8.

FIGS. 8 and 9 are perspective and plan views, respectively, for illustrating a pickup actuator according to a second preferred embodiment of the present invention.

As shown, the pickup actuator according to the second preferred embodiment of the present invention additionally has second damping means which utilizes a damping fluid. Except for the second damping means, the construction of the pickup actuator according to the second preferred embodiment of the present invention is identical with that of the first preferred embodiment of the present invention.

The second damping means has two pairs of second wire springs 44'a and 44'b, a pair of second supporting plates 90 and 90', and a second damping fluid 80'. The second wire springs 44'a and 44'b are extended in a symmetrical relation with respect to the first wire springs 44a and 44b about a plane extending parallel to the magnets 30 and 30' and vertically through a center of the objective lens 42. The second supporting plates 90 and 90' are respectively disposed adjacently to opposite side portions of the magnet 30. The second damping fluid 80' is applied between the second supporting plates 90 and 90' and the side portions of the magnet 30, to damp the vibration occurred when the lens holder 40 is driven. The supporting plates 90 and 90' are respectively disposed on the wire springs 44'a and 44'b in such a manner that the wire 44'a and 44'b are hung on a pair of hooks 90a and 90b which are formed integrally on side surfaces of each of the supporting plates 90 and 90'. The configuration and various alternatives to the configuration of the hooks 90a and 90b, the two pairs of wire springs 44'a and 44'b, and the supporting plates 90 and 90' are the same as those discussed previously with regard to the hooks 70a and 70b, the two pairs of wire springs 44a and 44b and the supporting plates 70 and 70'.

As shown in the figures, the second damping means of the pickup actuator according to the second preferred embodiment of the present invention is constructed identically as the first damping means. Thus, further description of the second damping means will be omitted.

The vibration damping processes in the pickup actuator according to the second preferred embodiment of the present invention also, are identical with the processes described in the first preferred embodiment of the present invention. The unique feature of the second preferred embodiment is that the vibration is damped by the first and the second damping fluids 80 and 80' applied between the supporting plates 70, 70', 90, and 90' and the magnets 30 and 30', wherein the supporting plates 70, 70', 90, and 90' are disposed on the first and the second wire springs 44a, 44b, 44'a, and 44'b which are disposed in a symmetrical relation with each other.

As described, according to the pickup actuator of the present invention, even when a vibration occurs at the lens holder while the lens holder is moved toward the directions of focusing and tracking, the vibration is directly damped by the damping fluid applied between the supporting plates disposed on the wire springs and the magnets. Thus, the objective lens reaches a designated spot and is settled therein more rapidly.

According to the pickup actuator of the present invention, especially when the vibration at the lens holder, caused by outside vibration and shock, the vibration of the lens holder is efficiently damped as described above. Therefore, the pickup actuator of the present invention has a high adaptability so that it can be employed into places having vibration of high intensity, such as an optical device of an automobile, etc.

Further, according to the pickup actuator of the present invention, since there is no need for the injection of a damper bond into an inner portion of the holder supporting portion of the base member, the manufacturing process of the optical pickup becomes simple, and the manufacturing costs thereof accordingly decreases.

Meanwhile, the damping fluid utilized in the present invention can be used together with the conventional damper bond, and still guarantees a remarkable damping effect.

Although the magnetic fluid is suggested as the damping fluid in the description of the present invention, it is not limited to the magnetic fluid only, but can be any material if it performs the same function described in the description of the present invention.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A pickup actuator of an optical device comprising:
   a base member;
   first and second pairs of wire springs;
   a lens holder disposed on the base member such that the lens holder is suspended by the first and second pairs of wire springs so as to allow the lens holder to be moved in directions of focusing and tracking, and on which an objective lens is mounted;
   lens holder driving means for driving the lens holder in the directions of focusing and tracking; and
   a damping fluid which is applied between the lens holder driving means and the first and second pairs of wire springs and damps a vibration occurring at the lens holder in response to the lens holder being driven.

2. The pickup actuator as claimed in claim 1, wherein the lens holder driving means comprises:
   a pair of magnets disposed at the base member, and spaced apart from each other, to generate a magnetic field; and
   a driving coil disposed at the lens holder and interacts electromagnetically with the magnets.

3. The pickup actuator as claimed in claim 2, further comprising a pair of yokes to maximize and concentrate a magnetic flux density generated by the pair of magnets in a desired direction, wherein the yokes are spaced apart from each other on the base member and face each other, and the magnets are respectively attached to inner side surfaces of the yokes.

4. The pickup actuator as claimed in claim 2, wherein the damping fluid has a viscosity ranging from 1000 cP to 2000 cP at about 27° C.

5. The pickup actuator as claimed in claim 4, wherein the damping fluid is a magnetic fluid having a magnetic property in the magnetic field.

6. The pickup actuator as claimed in claim 5, wherein the magnetic fluid is magnetized to 100 G~200 G in the magnetic field of 3~4 kOe.

7. The pickup actuator as claimed in claim 6, wherein the magnetic fluid is in a colloid state, in which magnetic particles are stably dispersed.

8. The pickup actuator as claimed in claim 7, wherein the magnetic particles comprise an element $Fe_3O_4$.

9. A pickup actuator comprising:
   a base member;
   a pair of yokes disposed at the base member and spaced apart from each other;
   a pair of magnets respectively attached to inner side surfaces of the yokes, to generate a magnetic field;
   first and second pairs of wire springs;
   a lens holder suspended by the first and second pairs of wire springs so as to be moved in directions of focusing and tracking in a space defined between the magnets, wherein an objective lens is mounted on the lens holder;

a driving coil disposed at the lens holder, to drive the lens holder in the directions of focusing and tracking by electromagnetically interacting with the magnets;

a pair of supporting plates each disposed on a respective one of the first and second pairs of wire springs which support the lens holder, the pair of supporting plates forming predetermined gaps with respective opposite side portions of one of the magnets, respectively; and a damping fluid which is applied between the pair of supporting plates and both opposite side portions of the one magnet, respectively, to damp a vibration occurring at the lens holder in response to the lens holder being driven.

10. The pickup actuator as claimed in claim 9, wherein the supporting plates are positioned between the respective first and second pairs of wire springs and the respective opposite side portions of the one magnet so as to be in contact with each wire spring of the respective first and second pairs of wire springs.

11. The pickup actuator as claimed in claim 10, wherein the supporting plates are made of a nonmagnetic material.

12. The pickup actuator as claimed in claim 11, wherein the nonmagnetic material is a plastic.

13. The pickup actuator as claimed in claim 9, wherein the first and second pairs of wire springs are disposed between the respective supporting plates and the respective opposite side portions of the one magnet, wherein the first pair of wire springs are in contact with a first one of the supporting plates and the second pair of wire springs are in contact with a second one of supporting plates.

14. The pickup actuator as claimed in claim 13, wherein the supporting plates are made of a nonmagnetic material.

15. The pickup actuator as claimed in claim 14, wherein the nonmagnetic material is a plastic.

16. The pickup actuator as claimed in claim 9, wherein the damping fluid has a viscosity ranging from 1000 cP to 2000 cP at about 27° C.

17. The pickup actuator as claimed in claim 16, wherein the damping fluid is a magnetic fluid having a magnetic property in the magnetic field.

18. The pickup actuator as claimed in claim 17, wherein the magnetic fluid is magnetized to 100 G~200 G in the magnetic field of 3~4 kOe.

19. The pickup actuator as claimed in claim 18, wherein the magnetic fluid is in a colloid state, in which magnetic particles are stably dispersed.

20. The pickup actuator as claimed in claim 19, wherein the magnetic particles comprise an element $Fe_3O_4$.

21. The pickup actuator as claimed in claim 9, further comprising:

third and fourth pairs of wire springs extending from opposite sides of the lens holder in a symmetrical relation about a plane extending through the objective lens, respectively and parallel to the pair of magnets with respect to the first and second pairs of wire springs;

a pair of second supporting plates each disposed on one of the third and fourth pairs of wire springs, respectively, the pair of second supporting plates being spaced apart from respective opposite side portions of a second one of the magnets; and a second damping fluid which is applied between the pair of second supporting plates and both opposite side portions of the second magnet adjacent to the second supporting plates, respectively, to damp the vibration occurring at the lens holder in response to the lens holder being driven.

22. The pickup actuator as claimed in claim 21, wherein the second supporting plates are positioned between the respective third and fourth pairs of the wire springs and the respective opposite side portions of the second magnet so as to be in contact with each wire spring of the respective third and fourth pairs of wire springs.

23. The pickup actuator as claimed in claim 22, wherein the second supporting plates are made of a nonmagnetic material.

24. The pickup actuator as claimed in claim 23, wherein the nonmagnetic material is a plastic.

25. The pickup actuator as claimed in claim 21, wherein the third and fourth pairs of wire springs are disposed between the respective second supporting plates and the respective opposite side portions of the second magnet, wherein the third pair of wire springs are in contact with a first one of the second supporting plates and the fourth pair of wire springs are in contact with a second one of the second supporting plates.

26. The pickup actuator as claimed in claim 25, wherein the second supporting plates are made of a nonmagnetic material.

27. The pickup actuator as claimed in claim 26, wherein the nonmagnetic material is a plastic.

28. The pickup actuator as claimed in claim 21, wherein the second damping fluid has a viscosity ranging from 1000 cP to 2000 cP at about 27° C.

29. The pickup actuator as claimed in claim 28, wherein the second damping fluid is a magnetic fluid having a magnetic property in the magnetic field.

30. The pickup actuator as claimed in claim 29, wherein the magnetic fluid is magnetized to 100 G~200 G in the magnetic field of 3~4 kOe.

31. The pickup actuator as claimed in claim 30, wherein the magnetic fluid is in a colloid state, wherein magnetic particles are stably dispersed.

32. The pickup actuator as claimed in claim 31, wherein the magnetic particles comprise an element $Fe_3O_4$.

33. A pickup actuator comprising:

a base member;

first and second yokes disposed at an upper surface of the base member, and spaced apart from each other;

first and second magnets respectively attached to inner side surfaces of the first and second yokes;

first and second pairs of wire springs;

a lens holder suspended by the first and second pairs of wire springs so as to be moved in directions of focusing and tracking between the first and the second magnets, wherein an objective lens is mounted on the lens holder;

a driving coil disposed at the lens holder, to drive the lens holder in the directions of focusing and tracking by electromagnetically interacting with the first and the second magnets;

a pair of first supporting plates each disposed on a respective one of the first and second pair of wire springs which support the lens holder, the pair of first supporting plates being spaced from respective opposite side portions of a first one of the pair of magnets;

third and fourth pairs of wire springs extending in a symmetrical relation about a plane extending through the objective lens and parallel to the first and second magnets with respect to the first and second wire springs, respectively;

a pair of second supporting plates each disposed on a respective one of the third and fourth pairs of wire springs, the pair of second supporting plates being spaced from respective opposite side portions of a second one of the pair of magnets; and a magnetic fluid which is applied between the first supporting plates and the respective opposite side portions of the first magnet and between the second supporting plates and the respective opposite side portions of the second magnet, and which damps the vibration occurring at the lens holder in response to the lens holder being driven.

34. The pickup actuator as claimed in claim 1, further comprising a damper bond, wherein said base member comprises a body member over which the lens holder is disposed, and a holder supporting section which support the first and second pairs of wire springs at respective one ends, wherein said holder supporting section has an inner space, and the damper bond is formed within the inner space.

35. The pickup actuator as claimed in claim 9, further comprising a damper bond, wherein said base member comprises a body member over which the lens holder is disposed, and a holder supporting section which support the first and second pairs of wire springs at respective one ends, wherein said holder supporting section has an inner space, and the damper bond is formed within the inner space.

36. The pickup actuator as claimed in claim 33, further comprising a damper bond, wherein said base member comprises a body member over which the lens holder is disposed, and a holder supporting section which support the first and second pairs of wire springs at respective one ends, wherein said holder supporting section has an inner space, and the damper bond is formed within the inner space.

37. The pickup actuator as claimed in claim 9, wherein each of said supporting plates comprises a pair of hooks which engage a respective wire spring of the one of the first and second pairs of wire springs from which each supporting plates hangs.

38. The pickup actuator as claimed in claim 21, wherein:

each of the supporting plates comprises a pair of hooks which engage a respective wire spring of the one of the first and second pairs of wire springs from which said each supporting plate hangs; and each of the second supporting plates comprises a pair of hooks which engage a respective wire spring of the one of the third and fourth pairs of wire springs from which said each second supporting plate hangs.

39. The pickup actuator as claimed in claim 38, wherein each of the hooks is not fixedly attached to the respective wire spring.

40. The pickup actuator as claimed in claim 33, wherein:

each of the first pair of supporting plates comprises a pair of hooks which engage a respective wire spring of the one of the first and second pairs of wire springs from which said each first supporting plate hangs; and each of the second pair of supporting plates comprises a pair of hooks which engage a respective wire spring of the one of the third and fourth pairs of wire springs from which said each second supporting plate hangs.

41. The pickup actuator as claimed in claim 40, wherein each of the hooks is not fixedly attached to the respective wire spring.

42. The pickup actuator as claimed in claim 9, wherein said damping fluid is applied between the pair of supporting plates and both side portions of one of the yokes to which the one magnet is attached, respectively.

43. The pickup actuator as claimed in claim 21, wherein:

said damping fluid is applied between the pair of supporting plates and opposite side portions of one of the yokes to which the one magnet is attached, respectively, and said damping fluid is applied between the pair of second supporting plates and opposite side portions of a second one of yokes to which the second magnet is attached, respectively.

44. The pickup actuator as claimed in claim 33, wherein:

said damping fluid is applied between the pair of supporting plates and opposite side portions of the first yoke, respectively, and said damping fluid is applied between the pair of second supporting plates and opposite side portions of the second yoke, respectively.

45. A pickup actuator of an optical device, comprising:

a base member having a holder supporting portion;

a lens holder which holds an objective lens;

first and second pairs of flexible members, extending from said holder supporting portion to respective first opposite sides of said lens holder, to support said lens holder;

a driving coil fixed to said lens holder;

first and second magnets formed at second opposite sides of said lens holder different from the first opposite sides, and extending perpendicularly to said first and second pairs of flexible members; and a damping fluid formed between opposite sides of said first magnet and the respective one of said first and second pairs of flexible members, at first positions between said lens holder and said holder supporting portion.

46. The pickup actuator as claimed in claim 45, further comprising:

a first supporting plate hanging from said first pair of flexible members; and a second supporting plate hanging from said second pair of flexible members;

wherein said damping fluid forms a first contact region between said first supporting plate and a first one of said opposite sides of said first magnet and a second contact region between said second supporting plate and a second of said opposite sides of said first magnet, and said first and second contact regions are at the first positions between said lens holder and said holder supporting portion.

47. The pickup actuator as claimed in claim 46, further comprising:

third and fourth pairs of flexible members, extending in opposite directions from said lens holder relative to said first and second pairs of flexible members, respectively;

wherein said damping fluid is formed between opposite sides of said second magnet and the respective one of said third and fourth pairs of flexible members, at second positions further from said holder supporting portion than said lens holder.

48. The pickup actuator as claimed in claim 46, further comprising:

a third supporting plate hanging from said third pair of flexible members; and a fourth supporting plate hanging from said fourth pair of flexible members;

wherein said damping fluid forms a third contact region between said third supporting plate and a first one of said opposite sides of said second magnet and a fourth contact region between said fourth supporting plate and a second of said opposite sides of said second magnet, and said third and fourth contact regions are at the second positions further from said holder supporting portion than said lens holder.

49. A pickup actuator of an optical device, comprising:

a base member having a body portion and a lens holder supporting portion formed on the body portion;

a lens holder which holds an objective lens;

first and second pairs of wire springs, extending from said holder supporting portion to respective first opposite sides of said lens holder, to support said lens holder;

a lens holder driving device to drive the lens holder, and having a first portion fixed to said base member and between said lens holder and said holder supporting portion, and a second portion further from said lens holder supporting portion than said lens holder; and a damping fluid formed between said first pair of wire springs and a first side of said first portion, and formed between said second pair of wire springs and a second side of said first portion opposite said first side.

50. The pickup actuator as claimed in claim 49, further comprising third and fourth pairs of wire springs, extending from said lens holder in opposite directions as said first and second pairs of wire springs, respectively, wherein said damping fluid is formed between third pair of wire springs and a first side of said second portion, and formed between said fourth pair of wire springs and a second side of said second portion opposite the first side of said second portion.

* * * * *

UNITED STATES PATENT AND TRADEMARK OFFICE
CERTIFICATE OF CORRECTION

PATENT NO. : 6,091,553
DATED : July 18, 2000
INVENTOR(S) : Myoung-jong Song et al.

Page 1 of 1

It is certified that error appears in the above-identified patent and that said Letters Patent is hereby corrected as shown below:

<u>Title page,</u>
Item [56], References Cited, FOREIGN PATENT DOCUMENTS,
"4-249224    12/1992    Japan" should be
-- 4-349224    12/1992    Japan --.
Item [57], ABSTRACT,
Line 17, "respectively for" should be -- respectively, for --.

Signed and Sealed this

Tenth Day of May, 2005

JON W. DUDAS
*Director of the United States Patent and Trademark Office*